United States Patent
Ibar (10) Patent No.: US 7,304,125 B2
(45) Date of Patent: Dec. 4, 2007

(54) PROCESS FOR THE PREPARATION OF POLYMERS FROM POLYMER SLURRIES

(75) Inventor: Jean-Pierre Ibar, Wallingford, CT (US)

(73) Assignee: Stratek Plastic Limited, Dublin (IE)

( * ) Notice: Subject to any disclaimer, the term of this patent is extended or adjusted under 35 U.S.C. 154(b) by 207 days.

(21) Appl. No.: 11/056,712

(22) Filed: Feb. 12, 2005

(65) Prior Publication Data

US 2006/0183881 A1    Aug. 17, 2006

(51) Int. Cl.
*C08F 6/00* (2006.01)

(52) U.S. Cl. .................. 528/502 R; 210/665; 422/189; 422/190

(58) Field of Classification Search ................ 210/655; 422/189, 190; 521/48.5; 528/502 R
See application file for complete search history.

(56) References Cited

U.S. PATENT DOCUMENTS

| | | |
|---|---|---|
| 5,380,822 A | 1/1995 | Skilbeck |
| 5,407,974 A | 4/1995 | Dallmeyer |
| 5,453,158 A | 9/1995 | Cummings et al. |
| 5,885,495 A | 3/1999 | Ibar |
| 6,207,606 B1 * | 3/2001 | Lue et al. ................... 502/113 |
| 6,210,030 B1 | 4/2001 | Ibar |

FOREIGN PATENT DOCUMENTS

| | | |
|---|---|---|
| DE | 4236039 | 4/1994 |
| EP | 0 583 082 | 9/1999 |

OTHER PUBLICATIONS

J.D. Ferry's "Viscoelastic Properties of Polymers", 2nd Ed., Wiley, Chapter 17—"Concentrated Solutions, Plasticized Polymers and Gels" (1989).
"Chain Dynamics in Entangled Polymers: Diffusion versus Rhelogy & Their Comparison", by S.Q. Wang, J. Polymer Science, Part B, vol. 41 1589 (2003).
"The Entanglement Concept in Polymer Rheology", W.W. Graessley, Advances in Polymer Science, vol. 16, Table 5.2, p. 55, Springer-Verlag (1974).
"Polymer Extrusion" by Chris Rauwendal, Hanser Publishing (1986), pp. 154-163.

* cited by examiner

*Primary Examiner*—Terressa Boykin
(74) *Attorney, Agent, or Firm*—Baker & Daniels LLP (57) ABSTRACT

A process for manufacturing a polymer having a molecular weight in excess of 5,000, and preferably in excess of 40,000, comprises, producing a polymerized reaction mass in which the polymer is dispersed, the reaction mass including solvent(s), unreacted monomer and other unwanted contaminants; feeding the reaction mass to a means for disentangling the polymer's molecules to produce a modified polymer in the reaction mass; feeding the modified polymer in the reaction mass to a polymer-recovering means; removing the unwanted volatiles and other byproducts; and, recovering a high molecular weight substantially pure modified polymer having substantially the same molecular weight as the polymer fed to the disentangling means and a viscosity at least 10% lower than that of the polymer fed to the disentangling means.

21 Claims, 3 Drawing Sheets

PROCESS FOR THE PREPARATION OF POLYMERS FROM POLYMER SLURRIES

FIELD OF THE INVENTION

This invention relates to the processing of polymers and in particular, a polymerized reaction mass formed as an equilibrium mixture in which the desired polymer contains unwanted volatilizable contaminants such as solvent(s), unreacted monomer(s) and contaminant oligomers. Initially, the contaminant(s) may be present in an amount as high as 20% by weight of the reaction mass which may then have the characteristics of a slurry, as for example, in the effluent of a reactor in which a interfacial polycondensation reaction is carried out. After partial removal of the contaminant(s) to a level of less than 1000 ppm, the "slurry" has different flow characteristics. Therefore, as used herein, "slurry" may also refer to a melt with less than 1000 ppm of contaminant(s). The invention is particularly directed to devolatilization of contaminant(s) to a level preferably below 100 ppm to yield a polymer having a high purity. Such high purity cannot be attained practically, using conventional equipment for treatment, namely decontamination and purification, without degrading the physical characteristics of the desired polymer or substantially decreasing its weight average molecular weight "Mw". By "substantially decreasing its molecular weight" is meant that the Mw of the desired high molecular weight polymer is not reduced by more than 10%.

BACKGROUND OF THE INVENTION

Commercially polymers produced by solvent and bulk polymerization, and by condensation generate a polymerized, viscous reaction mass as the concentration of their liquid contaminants decreases. To remove these contaminants from this reaction mass requires a high level of heat and shear energy (stirring, mixing, agitation, turbulence) under exerted pressure, whether reduced/negative (that is, under less than 1 psia, preferably a vacuum) or positive (that is, elevated pressure optionally in the presence of an inert gas) atmosphere). It is immediately evident that increasing pressure is directly opposed to a goal of obtaining a high diffusion coefficient "D" for a contaminant to be removed from a viscous reaction mass; and the limit to which temperature may be increased is that at which the desired polymer begins either to degrade physically, evinced by a change of color, or to suffer chain scission, or both. Therefore, when the polymer is to contain additives such as colorants, light stabilizers, anti-oxidants, heat stabilizers and finely divided inert particulate fillers, these are typically added after the desired polymer has been purified. However, they may be added prior to decontamination, and a filler such as a nanoclay may facilitate pretreatment of a slurry or reaction mass whether by phase separation in the liquid phase, or by devolatilization of volatiles, and eventual decontamination of the polymer.

The term "decontamination" is used herein to describe removal of unwanted contaminants, whatever conventional unit operation may be used to remove them. A typical pretreatment step refers to removal of an unwanted component in a reaction mass either (a) during a polymerization reaction and prior to being further treated, or, (b) after a polymerization reaction has reached equilibrium, and prior to being further treated.

The term "reaction mass" connotes the output of a polymerization reactor, which output is to be treated in the process described herein. Such output may be obtained either (i) directly from the polymerization reactor, or (ii) from a pretreatment step in which the reaction mass is pretreated to remove as much of unwanted contaminants as may be necessary to reduce their concentration to no more than 20%. Thus, in a melt polymerization, the reaction mass may be taken directly from the reactor. In an interfacial polycondensation using water and organic phases, the slurry from the reactor includes the polymer, reaction byproducts, unreacted monomer, finely divided solids whether filler, processing additives or the like which may be mixed into the slurry, and small amounts of initiator, catalyst, chain terminating agent, chain transfer agent, and the like which may be used in the reaction, all of which are distributed between the organic and aqueous phases. When the organic/aqueous solvents are present in an amount in excess of 50% by weight (50% by wt) of the slurry, it is pretreated to remove a major portion of both the aqueous phase and the organic solvent phase and leave less than 20% by wt of contaminants. Pretreatment may include a single unit operation, or plural operations in combination.

There is an increasing demand for an essentially pure high Mw polymer having a molecular weight Mw above the critical molecular weight for entanglement Mc of the polymer, typically Mw greater than about 5,000, containing only a specified minimal concentration of unwanted contaminants. This is true whether the contaminants in the polymerized reaction mass are present in the range from 0.1% to 3% of the reaction mass, as they typically are, after decontamination to remove contaminants, but before additional purification; or, are present in a larger amount in the range from 5% to 20%, as they might be, if taken directly from a reactor for a melt polycondensation reaction, or even in a major proportion by weight, as they might be if taken directly from a reactior for a solution condensation or interfacial polycondensation, thereafter to be treated and decontaminated.

In such condensation reactions, the Mw of the polymer is limited not only by the formation and presence of by-products but also by the fact that the high concentration of tightly entangled long polymer chains have chain ends which cannot be accessed by remaining monomer. Therefore, if the byproducts are removed while the reaction is still in progress, remaining monomer molecules can "find" the reactive chain ends and increase the molecular weight.

Irrespective of the high Mw polymer, the degree of difficulty of devolatilizing the last 1000 ppm of contaminant is determined by the structure and morphology of the polymer, the rheology of its melt, and the degree of difficulty increases as the Mw of the polymer and the viscosity of the melt increase. This difficulty is typically most evident in polymers having a Mw in the range from about 10,000 to 40,000, and higher, depending upon the particular polymer and the rheological properties of a reaction mass which is to be decontaminated.

The Problem:

Removal of unwanted contaminants from a reaction mass becomes increasingly difficult in high Mw polymers, that is, those having Mw depending upon the polymer being made. It is desired to decontaminate then purify the reaction mass in which the desired polymer has a Mw>about 5,000, typically at the upper limit currently deemed commercially practical. Such polymers can presently be decontaminated to contain less than about 1000 ppm of volatiles, but to decontaminate them below 1000 ppm, preferably below 100 ppm, is an extreme problem. Further it is desired to make a higher Mw polymer than is currently practical, at a temperature and pressure lower than those required to make the same high Mw polymer using the same conventional process, using the same reactor and identical reactants.

DE-4,236,039 discloses a method for the production of condensation polymers requiring plural stages, each with a reactor and water removal equipment. The reaction mixture is circulated through tubular heat exchangers to remove a majority of the water by-product, driving the reaction to a higher degree of completion in a first stage. Additional byproduct water is removed in a secondary stage.

Relatively recently, to avoid high temperature and pressure, a centrifugal pelletizing process using a centrifugal devolatilizing apparatus described in U.S. Pat. No. 5,453,158 side-steps the problems associated with conventional low pressure, high temperature devolatilization. Yet another way to do so is to use a solid state polymerization process. However, like all the older conventional processes, neither one of these processes suggests modifying the state of entanglement of the polymer molecules, for any reason. Since in the diffusion equation controlling the mass of material diffusing through unit area in unit time, the thickness of the element of area across which diffusion occurs does not suggest the physical state of the molecules in that area, there was no reason to conclude that disentangling molecules in a polymerization reaction mass was likely greatly to increase "D" and correspondingly greatly increase the mass of material transferred under the same conditions which would prevent that transfer if the molecules were not disentangled.

Most commonly, devolatilization is carried out in a single or twin-screw vented devolatilizing extruder. However, vents are a particular problem in high-speed processing with materials that do not adhere well to barrel walls, such as very high molecular weight polyethylene or very highly filled materials. Further, a vented extruder is only useful where the contaminant to be removed is in the vapor phase.

It will be evident from the foregoing that when the desired polymer has Mw <5,000, the viscosity of the polymer is generally low enough that devolatilization is not a problem even with a thermally sensitive polymer. By "thermally sensitive" is meant that the additive suffers noticeable and/or unacceptable degradation or change in physical characteristics at the temperature of melt in which the additive is dispersed, such degradation being referred to as "thermal degradation". When the thermally sensitive polymer has Mw>5,000 but less than 10,000, and the viscosity of the polymer is high enough that conventional devolatilization requires a temperature close to that at which the polymer is thermally degradable despite reduced pressure, the risk of devolatilization to a level below about 500 ppm is generally high. Most importantly, when the desired polymer has Mw>about 10,000, the viscosity of the polymer is often so high that effective devolatilization to below 500 ppm involves even higher risk becomes more difficult, and as the Mw increases above about 40,000, known processes and equipment for effective devolatilization to below 500 ppm become ineffective.

U.S. Pat. Nos. 5,885,495 and 6,210,030 issued to Ibar teach how to modify the physical and physico-chemical characteristics of a polymer melt, and how to make a "stress-fatigued" melt which is fluidizable at a temperature below the virgin polymer's conventional fluidization temperature. In the '495 process, virgin polymer, that is, conventionally manufactured solid polymer purchased in the market place, is extruded to form a melt which is then led into an apparatus referred to as a "TekFlow® processor", or "processor" for brevity, available from Stratek Plastic Ltd. (Dublin, Ireland) and SPRL Inc. (Wallingford, Conn., USA).

In the '495 process viscosity is reduced by heating a polymer above its fluidization temperature to form a melt; submitting the melt, at constant temperature, to the action of a vigorous mechanical vibration, at a constant amplitude and at a frequency of up to 100 Hz, for a chosen time at that temperature, causing the melt to become highly elastic, and simultaneously causing it to fatigue; and adjusting the vibration parameters to maintain the high elastic state, until the state of entanglement between the macromolecules has altered to a desired level, as measured by a change in viscosity and melt modules of elasticity of the melt.

In this process, the melt is mechanically vibrated and fatigued until the state of entanglement between the molecules has been modified to a desired level of disentanglement as measured by a decrease of at least 5% in the viscosity and melt modulus of elasticity relative to that of the virgin melt after correction of the influence of degradation of the chains, on viscosity. The resulting polymer, referred to herein as being "disentangled", "extensively shear-thinned", or "stress-fatigued" is referred to herein as "modified" polymer (for brevity), and is characterized by having a fluidization temperature at least 10° C. lower than the fluidization temperature of the same virgin polymer had it not been extensively shear-thinned and stress-fatigued.

Because a reaction mass to be treated is already fluid, if not a liquid, "fluidization temperature" of a polymerized reaction mass is defined as that temperature at which the reaction mass leaves the reactor. This fluidization temperature is conveniently in the range from about 10° C. to 200° C. above (i) the measured melt temperature (at ambient temperature of 25° C. and atmospheric pressure) for the polymer made, if it is recovered in substantially crystalline form, or, (ii) the glass transition temperature Tg of an amorphous polymer, at which the polymer begins to flow, if the polymer is recovered as an amorphous polymer.

There is no suggestion in the '495 patent that a reaction mass having a polymer dissolved therein, would be as susceptible to the energy imparted by the '030 apparatus as a solvent-free melt. Theoretical considerations on rheology of concentrated solutions in the linear range (see J. D. Ferry in "Viscoelastic Properties of Polymers", $2^{nd}$ Edition, Wiley, Chapter 17 (1989)) do not help predict what will happen when a slurry is brought into the non-linear range of viscoelasticity, which produces disentanglements. There is no reason to expect that large polymer molecules diluted with solvent, and therefore relatively spaced-apart compared to polymer molecules in a melt, would be effectively disentangled; the higher the proportion of solvent, the more difficult one would expect it to be to "find" and disentangle the spaced-apart molecules.

The '030 apparatus is configured to provide internals specifically adapted for the reaction mass to be processed. Though the '030 processor does not show vents, such as may be used to remove volatiles while the reaction mass is being processed, the addition of vents may be effected using conventional technology analogous to that used for venting a screw extruder. The details of construction of the '030 apparatus are incorporated by reference thereto as if fully set forth herein.

Referring to a prior art apparatus which modifies the rheology of a melt of polymer molecules, the '495 patent also states: "The second category of patents and processes using vibration is based on the fact that material rheology is a function of vibration frequency and amplitude in addition to temperature and pressure. This can be put to practical use to influence diffusion and rate sensitive processes which depend on viscosity and relaxation kinetics, such as nucleation and growth of crystals, blending and orientation". (col 2, lines 39-46). However, there is no suggestion as to how one might implement any desired influence on diffusion, or any modification of a rate sensitive process.

In particular, it is known that the diffusion coefficient of a molecule is a function of the viscosity of the liquid in which the molecule is held, the absolute temperature and the effective radius of the molecule. This relationship is given by the equation: $D=k_b T/6\pi\eta r$ where D=diffusion coefficient; $k_b$=Boltzman's constant; T=absolute temperature; η=viscosity; and, r=effective radius of the molecule. Knowing that the '495 process is effective to disentangle large molecules, and to decrease 'η' of the polymer, but not knowing how disentanglement affects 'r', it is not possible to know how the interaction of η and r might affect the diffusion coefficient of a contaminant molecule. Nevertheless, since the 'r' of a contaminant molecule is typically small relative to the polymer molecules, one would expect that a change in 'η' of the reaction mass would change "D" of the contaminant molecule through the reaction mass, but how such change will affect the processability of a melt and facilitate the devolatilization of a contaminant from the melt cannot be logically deduced. (See "Chain Dynamics in Entangled Polymers: Diffusion versus Rheology and Their Comparison" by S. Q. Wang, J. Polym. Sci., part B, Vol. 41, 1589 (2003)).

SUMMARY OF THE INVENTION

The rate of diffusion of unwanted volatile contaminants from within a polymerization reaction mass in which polymer molecules having Mw/Mc>1, typically having Mw> about 5,000, preferably in the range above 30,000 up to about 500,000, have been disentangled, is unexpectedly so high that volatile contaminants may be reduced to a substantially pure polymer having a concentration less than 1000 ppm, preferably less than 100 ppm, at a lower temperature and at a higher pressure than in the prior art to reach the same low concentration. With a heat sensitive polymer which previously required a high temperature near its degradation temperature, and low pressure less than 5 mm of Hg, a critical disentangling and shear thinning ("melt-fatiguing") of the polymer provides a treatment which yields a substantially pure undegraded polymer having a lower concentration of contaminant(s) than in a prior art undegraded polymer having the same Mw.

Using a known melt-fatiguing or disentangling means ("processor") to disentangle polymer molecules having a high Mw in the range indicated above, results in an undegraded "modified" desired polymer with substantially no reduction in Mw, yet provides a surprisingly high "D" of contaminant molecules through a reaction mass having lowered viscosity at essentially the same temperature and pressure. This critical step of extensively shear-thinning a reaction mass, preferably so that the viscosity of the polymer is reduced at least 5%, preferably at least 10%, relative to that of the polymer in its original, non-shear-thinned state, may be used in any polymerization process in which the viscosity is the limiting factor at the maximum permissible processing temperature at which the polymer is not degraded. It will be evident that the decrease in viscosity will depend not only on the viscosity of the polymer melt, but also upon the amount of diluent, e.g. solvent, unreacted monomer(s) and byproducts in the reaction mass.

Thus, in addition to several polycondensation reactions which are specifically detailed herein, the process may also be used to purify a reaction mass generated in a free radical polymerization, particularly in a solution polymerization or a bulk polymerization such as are used in the manufacture of poly(methyl methacrylate), and the solution polymerization of polysulfone. Irrespective of the polymerization process used to generate the polymer, addition of a small amount of a finely divided filler, the amount being less than 15% by wt of the polymer fed to a processor, and the filler having a primary particle size smaller than 5 μm, including even smaller particles in the range from about 5 nanometers to 1 μm, results in a negligibly small reduction in the efficiency of decontaminating the melt; as might be expected, higher concentrations in the range from about 15% to 30% by wt result in a noticeable reduction.

In a preferred condensation process, the key unit operation is feeding polymer having (Mw/Mc)≧5, wherein Mc=critical molecular weight of entanglement, after as much of the unwanted contaminants are removed as can be readily removed in a pretreatment step, to a processor or other disentangling means, to provide "modified" polymer molecules having desired high Mw in a shear-thinned reaction mass; thereafter, the shear-thinned reaction mass is fed to a conventional polymer recovery means to remove unwanted contaminants and purify the polymer. Values of Mc for a large number of polymers are tabulated in texts on rheology, e.g. See "The Entanglement Concept in Polymer Rheology", by W. W. Graessley, Advances in Polymer Science, vol. 16, Table 5.2 p. 55, Springer-Verlag (1974).

This process results in the recovery of substantially pure polymer having substantially the same Mw as the polymer made in the reactor, but the polymer has a MFI at least 5% higher, preferably at least 10% higher, than that of the same polymer before it was disentangled. Sufficient disentanglement for the purpose at hand results in the indicated increase in MFI and makes molecules of contaminants far more readily available for removal than one might have expected.

By changing the conditions of equilibrium, "modified", decontaminated polymer may be recycled to the reactor to increase its Mw further, and the mass of enlarged polymer is further decontaminated, again at a temperature lower and a pressure higher than those otherwise practical. This process side-steps the problem of "slippage" of non-disentangled polymer molecules in a conventional, "production devolatilizing extruder" in which the residence time is typically too low to remove volatiles, the result being polymer flung through the vents.

In a first embodiment, the process comprises, purifying a preferred polymer which has been made with the desired Mw in excess of 10,000 in a reaction mass after reaching equilibrium conditions. This process includes the steps of feeding the reaction mass having a solvent content in the range from about 1-20% by weight of the reaction mass, to the inlet of a disentangling means ("processor"); extensively shear-thinning the reaction mixture to produce modified polymer; recovering modified polymer in the shear-thinned reaction mass; feeding the modified polymer and unwanted contaminants to a conventional purification means; and, recovering substantially pure modified polymer having a melt flow index at least 5%, preferably at least 10% higher than that of unmodified polymer having substantially the same molecular weight. The conventional purification means preferably includes a decontamination means to reduce contaminants to a level low enough, typically less than 1000 ppm, so as to yield substantially pure polymer typically less than 100 ppm, after additional purification. In this embodiment, since the recovered decontaminated polymer has the desired Mw, it is not recycled, but further purified.

Typically, in a solution or melt polymerization, the conventional purification means includes a devolatilization means to recover devolatilized polymer for removing unwanted volatiles, and additional purification means including one or more additional steps, before yielding the desired polymer product. In a melt polymerization, the byproduct(s) is typically a volatile contaminant; in a solution polymerization, the solvent and/or remaining monomer and/or byproduct(s) are typically volatile components.

In a interfacial polycondensation reaction, the conventional purification means typically includes phase-separation means to remove the aqueous phase and byproducts therein; and means to transfer the organic phase to additional purification steps such as further phase separation, if necessary, washing, neutralizing, filtering, etc. which are conventionally carried out as post-disentanglement purification, the particular steps required being dictated by the polymer made in a chosen process. Volatiles and phase separated byproducts are removed from the process, typically recovered to the extent economically justified, and recycled.

In this and other embodiments, feeding a slurry having more than 20% by wt solvent(s) does not provide efficient disentangling. Thus, if the reaction mass in the reactor contains in excess of 20% volatile contaminant(s), the hot reaction mass is first flash-evaporated to reduce the content to less than 20% before feeding to a disentangling means ("processor"). When the slurry is reduced to a reaction mass containing so little solvent that it is a melt when heated to its fluidization temperature, the reaction mass is fed to the inlet of the processor.

If allowed to solidify, the reaction mass is fluidized in a melt-processing means such as an extruder, from which it is fed to the processor. In the schematic drawings provided herewith, such prior melt-processing as may be required is not shown, as feeding a processor with material at or above its fluidization temperature is essential and conventional.

In an interfacial polycondensation, hot slurry in the reactor contains in excess of 20% non-volatile contaminant(s); it is first phase-separated to contain as little water as possible, typically in the range from 1 to 5% by wt, and the remaining water-contaminated organic phase containing byproducts soluble therein, is fed to the processor. Because modified polymer leaves the processor and is further decontaminated and additionally purified, decontamination in the pretreatment step is not narrowly critical.

In a second embodiment, to increase the Mw of polymer produced in a reactor by changing the equilibrium conditions, the process comprises, producing a polymer in a reactor, molecules of the polymer having at least one reactive chain end and a molecular weight in excess of 5,000, preferably >110,000 dispersed in a reaction mass, including the steps described in each of the embodiments above, and recycling recovered, modified polymer to the reactor for further reaction with monomer to increase the Mw of the recycled polymer, typically with the addition of more monomer either in the reactor, or before returning to the reactor.

In a third embodiment, concurrent modification and decontamination of a preferred high Mw polymer, having a Mw in excess of 10,000, in a melt of a reaction mass is provided in a process comprising, feeding the reaction mass to the inlet of a shear-thinning means; extensively shear-thinning the reaction mass to produce modified polymer and concurrently removing unwanted volatile contaminants from within the disentangling means through vents therein; feeding shear-thinned reaction mass to a polymer-recovering means; and, recovering devolatilized modified substantially pure polymer having a MFI at least 10% higher than that of unmodified polymer, and, substantially the same molecular weight as that of the unmodified polymer.

In a fourth embodiment wherein a vented processor (concurrently modifying and decontaminating polymer) is used in combination with recycling modified polymer having reactive chain ends (after removal, in the processor, of a portion of unwanted contaminants more volatile than unreacted monomer), optionally with addition of more monomer, to the reactor. Upon being again fed to the processor, additional unwanted contaminants are removed from the recycled stream, shifting the equilibrium and causing further reaction of the modified polymers' chain ends as the polymer flows towards the outlet of the processor after being further-modified (because the recycled polymer was already modified). The further-modified polymer from the processor is fed to a polymer-recovering means, and additionally purified to yield substantially pure polymer. The further-modified polymer has a Mw at least 5% higher than that of modified polymer produced without selective removal of unwanted contaminants.

BRIEF DESCRIPTION OF THE DRAWING

The foregoing processes and additional advantages of the invention will best be understood by reference to the following detailed description, accompanied with the schematic illustration of preferred embodiments of the invention, in which.

DETAILED DESCRIPTION OF THE INVENTION

It is found that when a volatile contaminant in a slurry has "D" higher than $10^{-8}$ m$^2$/s at a temperature of at least (Tg+200° C.), devolatilization is not a problem even with available vented single screw or twin-screw extruders. When that "D" is higher than $10^{-9}$ m$^2$/s at a temperature of at least (Tg+250° C.), conventional devolatilization is generally effective in combination with reduced pressure without degrading the polymer. However, when that "D" is equal to or lower than $10^{-10}$ m$^2$/s at a temperature of at least (Tg+280° C.), coping with the problem of effective devolatilization becomes more difficult, and known processes and equipment become ineffective, at high production throughput.

It is also found that a 10% change in concentration of diluent (or solvent) causes≅400% change in viscosity. Thus, if the initial diluent concentration is 20% and the final concentration almost zero, the resulting increase in viscosity is about 25-fold, a very large increase in viscosity (See "Polymer Extrusion", by Chris Rauwendaal, Hanser Publishing (1986), pp. 154-163 wherein FIG. 5-5 shows diffusion constant as a function of solvent concentration at several temperatures for a system of PMA and methylacetate).

Consequently removal of the last 1%, more so removal of volatiles by diffusion to a concentration in the range from about 1 to 50 ppm, cannot occur unless a significant increase of temperature compensates for the decrease of "D" caused by a near-25-fold increase of viscosity. Taking published values (Handbook of Properties of Polycarbonate) for polycarbonate Mw=33,000, for example, corresponding to MFI=4.3 at 300° C., a 25-fold increase in viscosity would be compensated by a rise in temperature to 398° C., i.e. ≅100° C. increase. To produce a polycarbonate of Mw=62,000, corresponding to MFI=0.5 at 300° C., viscosity would rise to 10,000 Pa-s at 300° C. Devolatilization of contaminants below 3% would not be efficient even if temperature was raised to 400° C. since viscosity, computed=1,300 Pa-s, would still be too high to vent volatiles at an acceptable throughput. Raising temperature to 670° C. would lower viscosity to 195 Pa-s, i.e. to an operable range but at this temperature the polymer is degraded.

In the process of this invention, the "processing temperature" of a reaction mass in the "processor" prior to initial purification to remove contaminants, is at least 10° C. lower, preferably at least 30° C. lower than the conventional melt processing temperature of the same high Mw polymer, that is, had it not been disentangled. The range within which a "processing temperature" is chosen for any particular polymer will depend upon the viscosity of the reaction mass, the ease with which particular contaminants may be removed, the relative amounts of contaminants present, the thermal sensitivity of the polymer, the throughput desired, and other factors.

The effectiveness of the '495 process in this invention is derived from extensively shear-thinning the reaction mass in a "processor" so as to decrease the viscosity of the reaction mass at least 5% despite the presence of diluent, always at a temperature below the degradation temperature of the polymer. The output from the processor is then treated as dictated by the polymerization process. For example, where decontamination is by devolatilization, the processor may be equipped with conventional "vents" for devolatilizing the reaction mass as it travels from one end of the processor to its end. Volatile contaminants are removed through the vents and disentangled polymer is recovered which has substantially the same Mw as the entangled polymer in the reaction mass prior to its being shear-thinned, and the disentangled polymer is free from objectionable color and odor.

Where decontamination is by phase separation, as it may be in an interfacial polycondensation reaction, the output from the processor is phase-separated to remove the aqueous phase, and the organic phase further treated.

If desired, plural processors may be used in series to disentangle polymer chains further and reduce the viscosity still further, the polymer again being free from objectionable odor and color, and without substantially decreasing the Mw of the polymer as produced in the reactor. If required, plural decontamination steps may be used in series to decontaminate the reaction mass, either in a pretreatment step before it is disentangled, or in a decontamination step after it is disentangled.

Whether only purifying a polymer having desired high MW in a processor, or continuing the polymerization reaction in a processor where the reaction was started in a polymerization reactor, the process of this invention requires that the reaction mass be extensively shear-thinned without a processing aid, plasticizer or compatibilizer to decrease viscosity, and sufficiently raise the melt flow index (MFI) of the high MW polymer recovered, after removal of contaminants, by at least 10%, preferably more than 25% without substantially reducing the Mw of the polymer.

A contaminated polymer to be "modified" has Mw/Mc>1 and a concentration of contaminant, whether diluent or solvent, below which concentration the contaminated polymer behaves like a melt, that is, has the rheological properties which mimic those of a melt.

The result is an unexpected increase in the "D" of a contaminant through the reaction mass, sufficient to allow contaminants in the reaction mass to be diffused so quickly that the polymer is not thermally degraded at the temperature used. If it is desired to increase the Mw of the polymer initially made in the reactor, that is, "grow" the polymer, contaminant byproducts are preferentially removed, preferably under vacuum, leaving unreacted monomer to find reactive chain ends and react to increase the Mw. The high rate of diffusion results in a shorter residence time and higher mass transfer rates, and the lower viscosity of disentangled reaction mass allows devolatilization at lower temperature and higher pressure, therefore more rapid removal of contaminants than is possible in a devolatilizing extruder.

A typical polymerization process of the present invention involves charging a reactor with monomers, solvent or solvents, including catalyst, initiators, chain terminating agents, chain transfer agents, branching agents, molecular weight regulators and the like as may be chosen for the particular polymerization reaction to be carried out under conditions well known in the art. The reactor is operated in continuous or batch mode and the reaction mixture is held at a controlled temperature or in a temperature cycle until the polymerization is complete and the resulting reaction mass, typically a slurry, is discharged for further processing. Conditions of polymerization are those commonly used by one skilled in the art and depend on the specific monomer or combination of monomers being polymerized, and the desired Mw of the polymer product ("product"). A reaction mass from the process comprises desired polymer and unwanted contaminants including unreacted monomer, low molecular weight oligomers, cataylst, chain terminators, reaction-controlling agents, and other reaction byproducts of reaction deemed to be impurities which are removed by conventional processes depending upon the reaction mass being processed. The contaminants may be volatiles, solids or liquids, and the solids may be dissolved or partially dissolved.

Though the process of this invention may be used to the benefit of any polymerization reaction in which a contaminant is to be removed from a viscous high Mw polymer, the process is first described for a condensation reaction. A condensation polymer is defined for the purpose of the present invention, as a polymer produced from a polycondensation equilibrium reaction, wherein at least one by-product is produced, and wherein such by-product(s) inhibits the completion of the polymerization reaction due to its reaching an equilibrium state.

In a polycondensation equilibrium reaction, the reaction and its reverse reaction occur concurrently, resulting in a constant concentration of reactants. The reaction is driven to formation of polymer by the removal of any byproduct of reaction, whether water, alcohol, phenol or any other byproduct; therefore removal of the by-product(s) allows the reaction to proceed further, growing the length of the polymer molecules produced.

In a first embodiment, the reaction mass is disentangled, the contaminant(s) removed to a desired level, and, if the decontaminated, modified polymer has the desired Mw, it is further purified and recovered as substantially pure product.

In a second embodiment, if the devolatilized polymer does not have the desired Mw and has at least one reactive chain end, it is recycled to the reactor where, in the disentangled state of the polymer, it is readily reacted with additional monomer, more so since unwanted contaminants have been removed. If one or more byproducts are not sufficiently removed, and their presence unacceptably affects the growth of the recycled modified polymer, the byproducts may be removed by additional purification steps such as neutralization and washing and optionally, additional decontaminated before the purified modified polymer is recycled to the reactor.

The "reaction mass" in this embodiment refers to a mixture comprising one or more unreacted monomers, and the condensation polymer having either (i) terminated chain ends, or (ii) at least one reactive chain end, and, in either case, at least one unwanted contaminant of the polycondensation equilibrium reaction. By "unwanted contaminant" is meant a contaminant in the desired polymer product, such contaminant including remaining monomer (except if it is to be recycled), or any byproduct of the reaction. Unwanted contaminants, typically in liquid form, will vary depending upon the condensation polymer being produced. Some, such as water, phenol and ethylene glycol, are "volatiles" which are readily removed to a level of about 1000 ppm at a temperature at which a high Mw polymer is not thermally degraded, but further removal is far more difficult.

Polymers which may be processed as taught herein are exemplified by polycarbonate produced from diphenylcarbonate and bisphenol A, giving phenol as an unwanted by-product; polycarbonate produced from dimethylcarbonate and bisphenol A, giving methanol as an unwanted by-product; polycarbonate produced from dimethylcarbonate and the sodium salt of bisphenol A in an interfacial polycondensation giving NaCl as an unwanted by-product; polyaryl sulfone such as one produced in sulfolane solvent from a potassium salt of bisphenol A and a dichlorodiphenyl sulfone with KCl as the byproduct; polylactic acid produced from lactic acid and giving water as an unwanted by-product; Nylon 6,6 produced from adipic acid and hexamethylene diamine, giving water as an unwanted by-product; polyethylene terephthalate produced from ethylene glycol and terephthalic acid, giving water and ethylene glycol as unwanted by-products (ethylene glycol reacts with terephthalic acid, forming water and bishydroxyethylterephthalate, which then polymerizes to form polyethylene terephthalate and produces ethylene glycol); and polyethylene terephthalate produced from ethylene glycol and dimethyl terephthalate; giving methanol as an unwanted by-product.

The foregoing and other methods of producing polycondensation polymers under polycondensation equilibrium reactions, whether under melt conditions, under non-aqueous solvent conditions, or in interfacial condensation, are well known in the art and need not be detailed herein.

The polymerization reaction is conducted in either a batch reactor, or in a continuous reactor, some polymerizations being more economical in one or the other. Typically, if the reaction mass contains more than 20% by wt solvent, it is flash-evaporated to reduce the solvent content in the reaction mass to a point where it is fluid enough to be fed to a processor. If flash evaporation readily provides a substantially solid reaction mass, it is fed to an extruder or other melt-generating means, before being fed to a processor.

The basic process for producing a high Mw, substantially pure, condensation polymer comprises, feeding a fluid viscous slurry comprising the polymer having a Mw/Mc>5, preferably having a Mw>10,000 and unwanted contaminants and byproducts of reaction into a feed inlet of a disentangling means at a temperature below the degradation temperature of the polymer; disentangling molecules of the polymer sufficiently so that the viscosity of the polymer in the reaction mass is reduced at least 10% relative to the polymer's viscosity at the feed inlet; feeding modified polymer in the reaction mass to a decontamination means; removing unwanted contaminants; and recovering polymer product.

Figure 1:
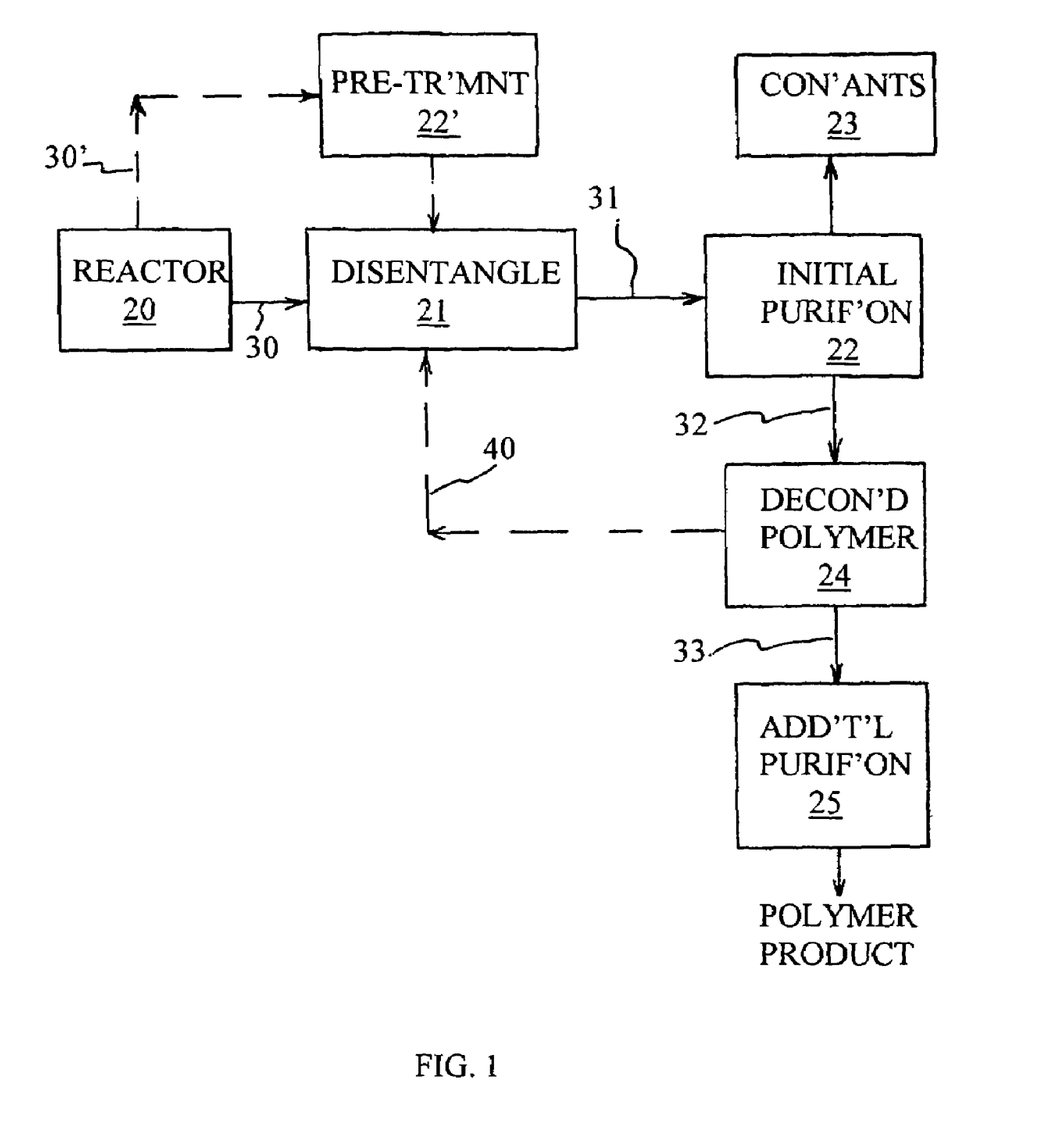
FIG. 1 schematically illustrates the process flow in a system in which a reaction mass either in solution, or in molten condition, depending upon the content of contaminant(s) and unreacted monomer, is pretreated if necessary, then stress-fatigued and extensively shear-thinned, modifying the polymer molecules; the reaction mass with modified molecules is then decontaminated, and the decontaminated, modified polymer molecules are additionally purified.

Depending upon the amount of solvent/byproduct in the reaction mass 30 from the reactor 20, processing is carried out as schematically illustrated in FIG. 1 which is a flowsheet for one embodiment of the process in which the reaction mass from the reactor 20 contains either (i) from 1% to 20 wt % contaminants, whether solvent(s) and/or byproduct contaminants; or (ii) in excess of 20%, as indicated by the dashed line showing effluent 30' flowed from the reactor to pretreatment step 22' before being fed to disentangling step 21. Typically, decontamination is by phase-separation if the organic phase can be phase-separated in one or more steps; and by flash-evaporation in one or more steps, if the contaminant is volatile.

If effluent 30 is in the range from 1% to about 20% by wt of the reaction mass, the reaction mass may be directly transferred from the reactor to a "processor" for disentangling step 21, and then, as a hot, fluid reaction mass, under pressure from 1 to about 20 atm, and from 10° C.-100° C. above the fluidization temperature of the polymer, to an initial purification step 22 to yield decontaminated polymer 24. Contaminants 23 are removed by the initial purification step, and typically processed further to recover solvent.

If effluent 30 contains more than 50% by wt solvent(s), as it usually does in either a solution polymerization or an interfacial polycondensation reaction, the effluent is pretreated.

A slurry from a solution polymerization, including >50% by wt solvent, is typically pretreated in a pretreatment step 22' to devolatilize the reaction mass, typically by flash-evaporation, under conditions which readily provide a low contaminant content, preferably from about 1%-10%. The pretreated reaction mass is then transferred to processor 21 at pressure from 1 to about 20 atm, and at a temperature from 10° C.-100° C. above the fluidization temperature of the polymer. The hot, fluid reaction mass, is then flowed to initial purification means 22 to yield devolatilized polymer 24.

The direct application of a vacuum through a port in the processor, which vacuum is in the range from about $10^{-4}$ to 25 mm Hg, preferably below 1 mm Hg, while the slurry or reaction mass is being sheared will usually lower the volatiles content to within a range of from 20 ppm to 200 ppm, depending upon the Mw of the polymer. A volatile content of less than 100 ppm is achieved with (Mw/Mc) in the range from 6 to 10, and the vacuum applied is in the range from $10^{-4}$ to $10^{-2}$ mm Hg.

The processor is pressurizable and provided with melt seals adapted for operation up to 20 atm, so as to allow use of a stripping agent under pressure to facilitate removal of contaminants. The stripping agent may be an inert gas unreactive with any component of the reaction mass, or an inert solvent vaporizable under the operating temperature and pressure of a vented processor. Preferred are nitrogen, carbon dioxide, methanol, lower ($C_1$-$C_5$) alkanes and water.

An example of a devolatilization system is disclosed in an article entitled "Application of an Enhanced Flash-Tank Devolatilisation System to a Degassing Extruder", by T. O. Craig, Advances in Polymer Technology, Volume 10, No. 4 (1990), pages 323 to 325. Steam is used as a stripping agent in a process disclosed in U.S. Pat. No. 5,407,974 to Polysar. Other polymer devolatilization processes are disclosed in U.S. Pat. No. 5,380,822 and published European Patent Application EP-A-0583082, inter alia.

A reaction mass from an interfacial condensation is pretreated by removing as much of the aqueous phase as can be, by phase separation. If the amount of organic solvent is still greater than 20% by wt, the necessary amount of organic solvent is removed, e.g. by flash evaporation. Dichloromethane (b pt 40° C.) is readily removed relative to remaining water so that the concentration of solvents is reduced to less than 20%.

The disentangled polymer in stream 31 is transferred to initial purification step 22 where contaminants are removed to yield a stream 32 which is decontaminated product 24 containing less than 1000 ppm, preferably less than 100 ppm of contaminants, and most preferably less than 10 ppm.

If insufficiently decontaminated, the decontaminated product 24 is recycled as effluent 40 to the disentangling step 21 for further disentangling and further decontamination in 24 to the level desired.

Figure 2:
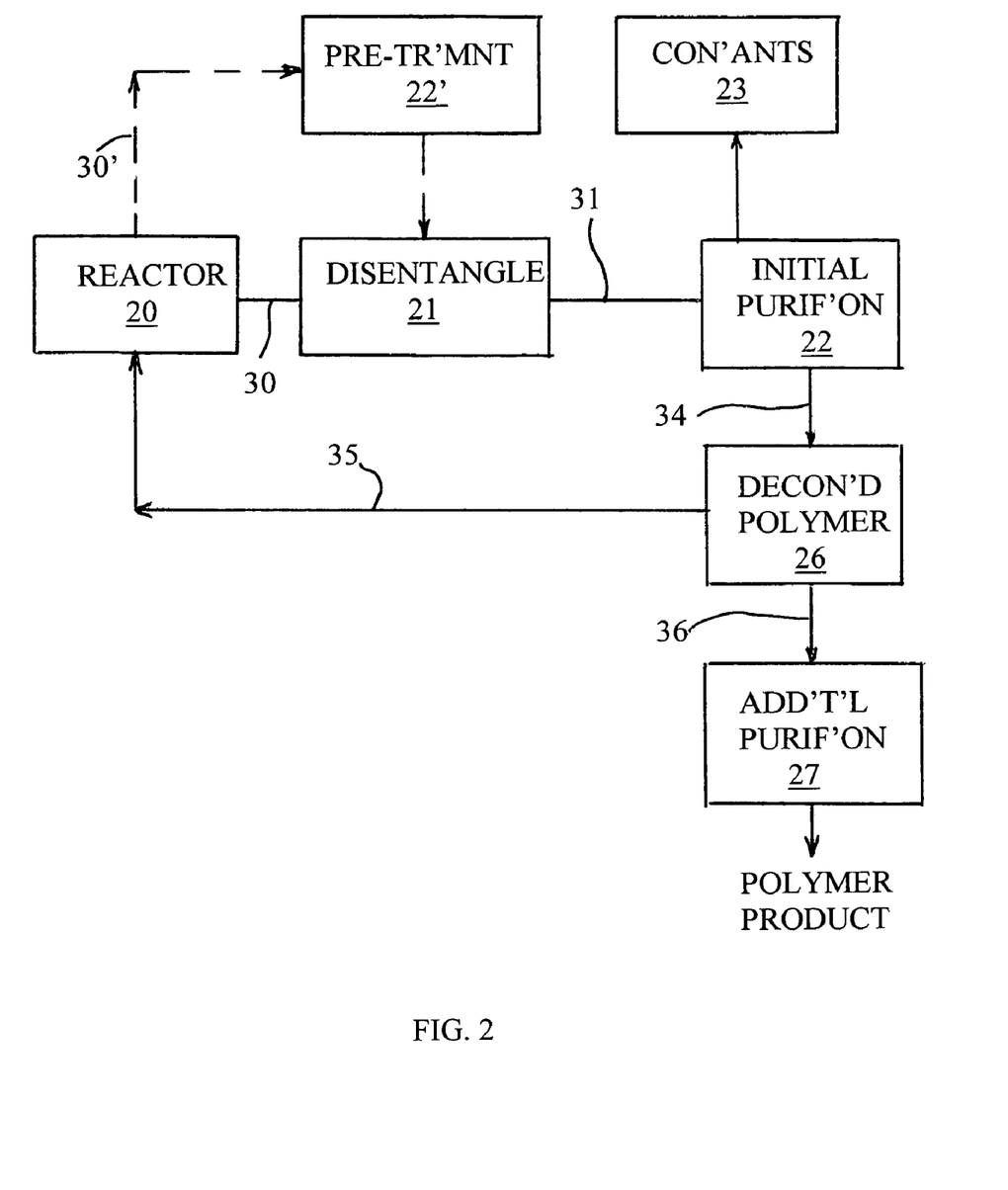
FIG. 2 schematically illustrates the process flow in a system analogous to that described in FIG. 1, except that, to increase the Mw of the decontaminated polymer, a portion of the decontaminated reaction mass is recycled to the reactor.

Effluent 40, if not fluid as obtained after devolatiliztion, may be fed through an extruder (not shown) to melt and fluidize the solids. The molten fluidized solids may be fed either (i) to the processor 21 for further shear-thinning and further devolatilization, or (ii) to the reactor 20 for further reaction to increase the Mw of the polymer as shown in FIG. 2.

The highly decontaminated stream 23 containing less than 5%, preferably less than 1% contaminants, is then further convetnionally purified in the additional purification step 25 to yield substantially pure polymer product.

It will be appreciated the particular choice of processing steps and conditions will depend upon the polymer being prepared in the reactor. For example, in the preparation of polycarbonate by the melt process, a transesterification reaction occurs between an aromatic ester of carbonic acid condensed with a bisphenol (e.g. bisphenol A) in the presence of basic catalyst, forming a high Mw polycarbonate, and no solvent is used. But removing unreacted monomer and unwanted byproduct phenol is difficult. Removal of all contaminants is facilitated by the process illustrated in FIG. 1 herein, and typically, no recycle of devolatilized polymer is necessary.

In the preparation of polycarbonate, in a "solvent process", bisphenol A is reacted with phosgene in pyridine with the formation of pyridine hydrochloride. Removal of solvent and byproduct contaminants is facilitated by the process illustrated in FIG. 1 herein, and, when the solvent content is greater than about 20%, the the reaction mass is typically flash-evaporated in pretreatment means 22' to lower the contaminant content to less than 20%, and then the once-devolatilized reaction mass, after being shear-thinned by dissentangling means 21, is again devolatilized in 22, to yield devolatilized polymer, as described above.

Referring to FIG. 2 there is shown an embodiment illustrating production of a specific, desired polymer required to have a higher Mw (about 50,000) than can be readily made under equilibrium conditions. Under conventional processing steps, only a polymer having Mw=40,000 can be made, and it is this polymer which is to be further grown into one having Mw=50,000.

The Mw 50,000 polymer can be made in reactor 20 if the equilibrium is shifted by removing the byproducts of reaction and returning the decontaminated polymer to the reactor for further reaction with more monomer(s).

Accordingly, referring to FIG. 2, a viscous reaction mass with polymer Mw=40,000 is pumped from reactor 20 through conduit 30 to the disentangling means 21 where the viscosity is reduced as before, and the effluent containing disentangled polymer chains with at least one reactive chain end, is transferred through conduit 31 to initial purification step 22. Contaminants 23 are removed and the remaining polymer 26 transferred through conduit 34 to be portioned between recycle stream 35 to the reactor, and the additional purification means 27.

The recycled polymer 26 is re-dissolved in the reactor and reactive chain ends of the polymer molecules are available for further growth by reaction with monomer in the reactor.

As an alternative, if initial purification yields a substantially solid stream 34, the solids may be fed to an extruder (not shown) or other polymer-melting means to fluidize the solids stream before it is introduced into the reactor.

After being purified as required, the polymer product having a Mw=50,000 is recovered, which Mw is higher than that of the polymer initially made in the reactor without recycle.

Figure 3:
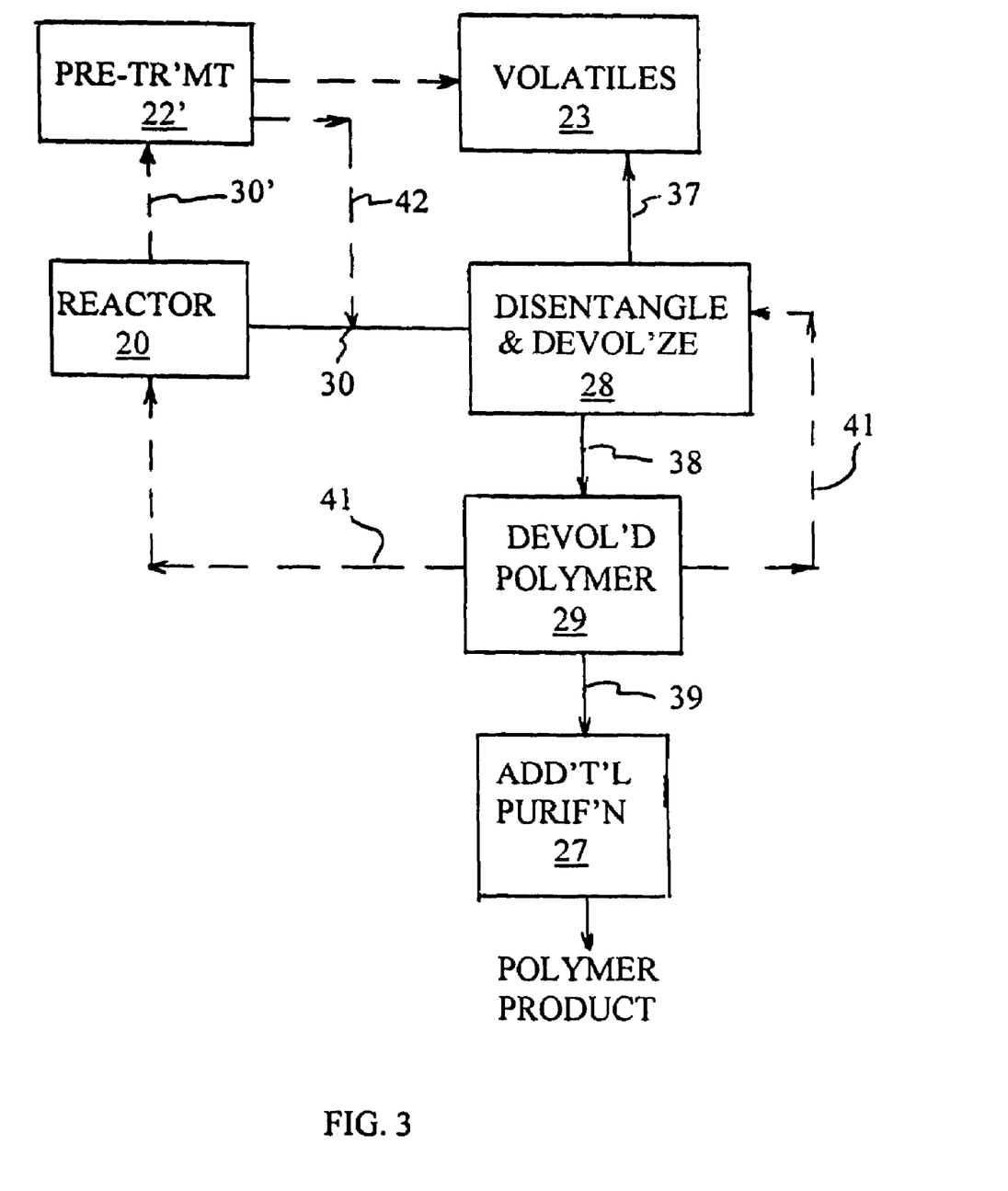
FIG. 3 schematically illustrates the process flow in a system analogous to that described in FIG. 2, except that the contaminant(s) is volatile and devolatilization is done in the processor concurrently with shear-thinning the polymer, so that it is not necessary to recycle devolatilized polymer unless it is desired to grow the molecules.

Referring to FIG. 3, there is schematically illustrated an embodiment of the process which uses a processor, except that it is vented, so that it is referred to herein as a "vented processor" and accorded a different reference numeral 28. Such a vented processor is particularly well-adapted to process a reaction mass in which the contaminants are volatile under chosen processing conditions.

Using a vented processor, it will now be evident that the disentangling and devolatilization steps illustrated in embodiments of FIGS. 1 and 2, will be combined when the vented processor is used to provide the steps described in those embodiments.

In addition, the vented processor 28 of adequate length, or plural processors operated in series, may function as an additional reactor (within the body of the processor) for increasing the Mw of polymer, because when contaminants other than monomer are preferentially removed, the polymerization reaction continues as the equilibrium is shifted.

For example, if 40,000 Mw polymer is made in reactor 20, but a polymer having Mw=50,000 is required, in one embodiment, the reaction mass containing polymer having Mw=40,000 is fed from reactor 20 through conduit 30, optionally pretreated in 22', to remove volatiles which may be combined with those removed from the vented processor 28 equipped with venting means along its barrel. The pretreated reaction mass is flowed through conduit 42 to be fed to the vented processor 28.

Since the desired Mw is 50,000, the length of the barrel is adjusted for the expected residence time required, and the temperatures along the length of the processor are adjusted so as to provide the optimum conditions for polymerization, yet to remove the unwanted byproducts preferentially, leaving the maximum amount of monomer(s) which can then find reactive chain ends of the disentangled polymer as it proceeds through the processor.

For example, in a transesterification reaction to produce polycarbonate having Mw=50,000, dimethylcarbonate and bisphenol A are reacted At 190° C.-320° C. and reduced pressure (0.1 kPa) to produce phenol as a byproduct.

Removal of the most volatile contaminant, phenol, commences preferentially in the first vent nearest the inlet, and continues along the length with less volatile contaminants being removed in the remaining vents as the reaction mass is disentangled and moved longitudinally along the processor. The phenol is readily preferentially removed, leaving unreacted diphenylcarbonate monomer to continue to add to chain ends of the polymer progressing towards the outlet of the processor.

The recovered polymer product, after additional purification, has a Mw of about 50,000 which is substantially higher than that of the polymer made in the reactor. Since further reaction with the polymer generates the desired higher Mw polymer, there is typically no need to recycle the devolatilized polymer 29.

However, if the Mw of the devolatilized polymer 29 in stream 38 is not high enough, the polymer 29 may be recycled as stream 41, either (i) to the reactor, as shown by the dotted line, optionally through an extruder as described in FIG. 2, or (ii) to the reactor 20.

If the desired Mw can be made in the reactor, and no further growth of the polymer is required, the function of the vented processor also functioning as a reactor is unnecessary, and the goal is to remove the maximum amount of contaminants, no effort being made to remove byproduct in preference to unreacted monomer(s). Under such conditions, some increase in Mw may nevertheless be obtained in the vented processor as a result of removal of byproduct and the shifting of the equilibrium of the reaction, as the polymer is devolatilized.

In either process, whether the Mw is increased substantially or essentially not at all, modified devolatilized polymer 29 (from the outlet of devolatilizing means 28) is preferably then fed to an additional purification means 27 and conventionally purified. When solid or non-volatile contaminants are byproducts, they may be conventionally removed, for example by filtration with filters adapted for the purpose.

Devolatilization processes, effective to devolatilize the reaction mass with disentangled polymer, are well known to those skilled in the art, and are not, per se, claimed to be novel, the one chosen being selected for the particular reaction mass being processed, and the process conditions of the stream 31. The direct application of a vacuum in the range from about $10^{-4}$ to 1 mm Hg while the reaction mass is being sheared at a temperature below the polymers degradation temperature, will usually lower the volatiles content to within a range of from 20 ppm to 200 ppm, depending upon the Mw of the polymer. A volatile content of less than 100 ppm is achieved with Mw in the range from 10,000 to 50,000, and the vacuum applied is in the range from about $10^{-4}$ to $10^{-2}$ mm Hg.

Another known devolatilization process comprises mixing the reaction mass with an inert stripping agent such as water, methanol or carbon dioxide. When the resultant mixture is pumped under pressure and "let down" to a heated vessel at reduced pressure, the stripping agent produces a mass of bubbles in the viscous reaction mass, promoting diffusion of volatiles out of the reaction mass. An example of an arrangement for carrying out the above devolatilization process is disclosed in an article by T. O. Craig entitled "Application of an Enhanced Flash-Tank Devolatilisation System to a Degassing Extruder", Advances in Polymer Technology, Volume 10, No. 4 (1990), pages 323 to 325. Steam is used as a stripping agent in a process disclosed in U.S. Pat. No. 5,407,974 to Polysar. Other known polymer devolatilization processes are disclosed for example in U.S. Pat. No. 5,380,822 and published European Patent Application EP-A-0583082, the disclosures of which are incorporated by reference thereto as if fully set forth herein.

Operation of the processor is "tuned" by adjusting the amplitude, frequency, and duration of shear vibration, the rate of motion of the surfaces shearing the melt, and the amount of extensional fatigue, so as to produce the desired degree of disentanglement as evidenced by the reduction in viscosity of the reaction mass without substantially decreasing the Mw of the polymer. In a typical process, the amplitude of oscillation, expressed in strain % will be in the range from about 10% to 100%, preferably between 20% and 50% and most preferably between 30 to 40% strain. The frequency of oscillation will typically be between 1 Hz and 150 Hz, and preferably between 5 Hz and 30 Hz. The frequency of local vibration produced by the rotation of the ribs can be as high as 800 Hz, depending on the specific design of the number of ribs per turn. The strain amplitude and frequency of oscillation may be chosen to allow a certain amount of counter-rotation, at each cycle, or to simply add a modulation to the constant RPM cross-rotation, where the rotational speed always remains positive. If several TekFlow processors are operatively interconnected, the processing parameters of each of them are specifically adapted to the viscoelastic state developing after each vent. The combined strain rate on the melt from cross rotation, oscillation and longitudinal flow is typically between 10 and 2,000 $sec^{-1}$, and preferably between 35 and 500 $sec^{-1}$.

EXAMPLE 1

The following illustrative example describes the expected processing of a typical reaction mass containing polycarbonate having a molecular weight of 50,000 which could not be made with the conventional process without thermally degrading the polymer during the polymer-recovery steps.

Referring to FIG. 1, there is illustrated an embodiment of the process wherein polycarbonate having a desired Mw of 40,000 is obtained in an interfacial polycondensation of chemically pure sodium salt of bisphenol A in an aqueous phase, and phosgene, present in a slight excess, in dichloromethane (methylene chloride) optionally mixed with higher boiling solvents as the organic phase, in the presence of excess sodium hydroxide. During phosgenation the pH is maintained in the range from pH 9-11. After formation of carbonate oligomers, a catalyst of the tertiary alkaline amine type, is added in an amount required to satisfy the chosen residence time in the batch reactor used. The pH of the aqueous phase during polycondensation is kept in the range from pH 9-14. Monofunctional phenols (abut 3-5 mol %) are added as chain terminators before addition of the catalyst to control the molecular mass.

The reaction mass, after reaching equilibrium is phase-separated either by centrifugation to separate the aqueous phase from the organic phase; or, in a settling tank under sufficient pressure to maintain the water and dichloromethane as liquids at a temperature in the range from about 110° C. to 180° C. Temperatures much higher tend to degrade the polymer which is more thermally degradable in the presence of water. The aqueous layer containing some organic compounds and the inorganic salts formed during reaction, is drawn off. The dichloromethane layer has the polycarbonate formed, unreacted bisphenol A salt, some of the excess caustic, part of the NaCl byproduct, and some sodium carbonate (formed from the competing side reaction of phosgene with excess sodium hydroxide), which are together present in >50% by wt of the mainly organic phase (some water). This organic phase is flash-evaporated as a second unit operation of the pretreatment step until the dichloromethane and water are in the range from 1 to 10% by wt, the remaining being mainly polymer. This hot reaction mass is fluid as it flows out of the pretreatment, but when the concentration of contaminants is less than about 5%, the viscosity of the reaction mass is so high that, with conventional recovery processes, the polymer is unacceptably thermally degraded during recovery even under vacuum of $10^{-2}$ mm of Hg.

The pretreated reaction mass with about 8% contaminants is fed to the inlet of a TekFlow® processor, and the polymer shear-thinned to reduce the viscosity of the reaction mass. If the concentration of water is more than about 5%, the initial purification step 22 is preferably phase-separation, followed by flash-evaporation of the organic phase. If the concentration of water is less than about 5%, the reduced-viscosity reaction mass is transferred to a flash-evaporating tank or fractionation column 22, and volatiles are removed overhead.

The decontaminated modified polymer having a lower viscosity than a polymer having the same Mw but not disentangled, is obtained as a hot fluid, essentially free from volatiles. The hot polymer is then transferred to any additional purification means conventionally used to purify the polymer, e.g. a filtration means and/or a washing means. For example, the devolatilized polymer containing less than 1% by wt contaminants, is washed with dilute aqueous alkali solution to remove traces of bisphenol A and chain terminator. The next wash is performed with a dilute solution of a strong mineral acid to reduce alkalinity. Then the polymer is washed several times with demineralized water to remove remaining traces of electrolytes.

The amount of volatiles left in the devolatilized reaction mass may be varied depending upon the subsequent additional purification steps to be taken.

In a particular instance in which a reaction mass having about 72% by wt polymer and 18% by weight of mainly water, dichloromethane and the sodium salt bisphenol A in dichloromethane and water, is fed to the processor, the effluent from the processor is flowed to initial purification where the effluent is first phase-separated and the organic layer of mainly dichloromethane recovered. It is then flash-evaporated to yield decontaminated polymer which is then additionally purified. A concentration of contaminant(s) in a polymer having Mw/Mc=7.25, where Mc=5,500 is reduced to 100 ppm in a single flash-evaporation step.

Recovery of the polymer from solution is typically by addition of a suitable non-solvent such as a $C_5$-$C_{16}$ aliphatic hydrocarbon, acetone, cyclohexane, ethyl acetate, toluene or $C_3$-$C_8$ alcohols. The precipitated polycarbonate is then filtered. Such additional purification results in recovered polymer having a Mw of 39,000, with volatiles reduced to less than 100 ppm, preferably less than 50 ppm.

The solvent and non-solvents are recovered for reuse.

As indicated above, the solvent may be directly evaporated in a devolatilizing extruder, without plugging the vents provided at a temperature and residence time at which the polymer is not unacceptably degraded.

In a comparison with a conventional recovery process for the same polymer in the same slurry, the viscosity of the slurry as it is pumped through conduit 30 is so high that polymer is degraded during recovery even under vacuum of $10^{-2}$ mm of Hg at a temperature chosen to devolatilize the slurry at a practical rate.

EXAMPLE 2

Referring to FIG. 2, there is illustrated an embodiment of the process wherein it is desired to increase the Mw of polycarbonate having Mw/Mc=7.25 made under equilibrium conditions, to a polycarbonate having Mw/Mc=9, which cannot be made under those equilibrium conditions. For example, the polycarbonate having Mw=40,000 obtained above is to be increased to about 50,000. Accordingly, the phase-separated reaction mass is fed to the disentangling step 21, thereafter to the initial purification step 22 where the liquids are again phase-separated under pressure to remove water-soluble inorganic byproducts, and the organic layer recovered. Additional fresh hot water is added and all, or only a portion of the mixed aqueous and organic phases is returned to the reactor. When the polymer formed reaches the desired Mw it is led to the additional purification step and purified as before.

EXAMPLE 3

A solution polymerization of methylmethacrylate in toluene is carried out in a reactor 20 (FIG. 1) by adding only enough initiator to control the Mw, namely, less than 0.1% by wt benzoyl peroxide slowly, to make poly(methylmethacrylate) (PMMA), having a desired Mw of 75,000 (Mw/Mc=2.73). Upon the reaction reaching equilibrium after the desired Mw is reached, the reaction mass is pretreated by flash-evaporating all but about 5% by wt toluene, at 110° C., to yield a solid highly contaminated polymer. The viscosity of the polymer before being shear-thinned is about 400 Pa-s.

This solid polymer is fed to an extruder and then to a processor 21 where it is shear-thinned as a melt with 5% solvent heated initially, near the inlet to a temperature of about 110° C. with an amplitude of oscillation of about 35% strain, a frequency of oscillation of about 20 Hz, the combined strain rate on the melt from cross rotation, oscillation and longitudinal flow being in the range from 50-700 sec$^{-1}$ to yield modified PMMA having a Mw of about 2.72 Mc (about 38,000).

This modified polymer is flowed to initial purification where it is again flash-evaporated at about 110° C. in a cascading thin film evaporator to reduce the concentration of solvent to less than 100 ppm. The reduced pure melt viscosity is about 350 Pa-s at the die. The solvent is recovered for reuse.

In an analogous manner substantially pure modified PMMA having a Mw in the range from about 100,000-300,000 may be produced without noticeable degradation and without substantial loss of Mw due to having been disentangled.

EXAMPLE 4

A solution polymerization for the production of bisphenol A sulfone is carried out by nucleophilic substitution of 4,4'-dichlorodiphenyl sulfone (DCDPS) by 4,4'-(1-methylidene)bisphenol (bisphenol A) in a dipolar solvent such as dimethyl sulfoxide (DMSO). The reaction is carried out in two stages. First, addition of two equivalents of aqueous NaOh or KOH to a solution of the bisphenol in a mixture of DMSO and azeotropic solvent, e.g. chlorobenzene, generates the more nucleophilic bisphenolate salt. Excess water is then removed by azeotropic distillation at 120° C.-140° C. before the dichloro monomer is added and polymerization proceeds at from 130° C.-160° C. under an inert atmosphere to prevent oxidation of the bisphenolate salt. The pretreated contaminated polymer is then fed to a processor in one of the process schemes illustrated, to decontaminate the polymer and produce a substantially pure undegraded polymer.

EXAMPLE 5

Poly(ethylene terephthalate) (PET) is produced from dimethyl terephthalate (DMT) in a transesterification melt polymerization as follows: Molten DMT and ethylene glycol are reacted in heated, stirred transesterification reactors at 150° C.-200° C. The excess of ethylene glycol is typically in the range from 0.5-1 mol/mol of DMT. At the start of the reaction at ambient pressure and in a nitrogen atmosphere) the lower the temperature the less the sublimation of DMT. The methanol released during the reaction is continuously removed from the reaction mixture.

A weakly basic compound such as an amine, metal oxide, or an alkoxide in an amount from 0.01 to 0.1 wt % (based on DMT) is used to give a desirable rate of reaction at moderate temperature below the degradation temperature of polymer formed.

The transesterification product is added as a melt to a polycondensation reactor with stirrer, which reactor is heated to about 300° C. Some of the excess ethylene glycol may be distilled off as the temperature is gradually increased past 250° C. Polycondensation follows while pressure is reduced and the temperature is raised to about 280° C. when the pressure is reduced to <1 mbar. The reaction is accelerated with a transesterification catalyst which also decreases the thermal stability of the polymer and may be replaced with special polycondensation catalysts usually antimony, germanium, titanium, or lead compounds at a concentration of from 0.005-0.5 wt % (based on DMT). Rapid polycondensation is achieved by removing the eliminated ethylene glycol.

Polycondensation is stopped when a chosen melt viscosity is attained by releasing the vacuum with oxygen-free nitrogen and the melt is expelled from the reactor into a processor for further removal of ethylene glycol and other contaminants. Undegraded, substantially pure PET having a solution viscosity in excess of 80 cm$^3$/g measured inphenol/tetrachloroethane 60/40 wt % at a concentration of 0.0023 g/cm$^3$ may be produced as described with a processor directly connected to the reactor and the Mw of the polymer is at least 10% higher than unmodified PET having the same solution viscosity.

Having thus provided a general discussion, described the overall process in detail and illustrated the invention with specific illustrations of the best mode of making and using it, it will be evident that no undue restrictions are to be imposed by reason of the specific embodiments illustrated and discussed, and particularly that the invention is not restricted to a slavish adherence to the details set forth herein.

I claim:

1. A process for purifying a high molecular weight (Mw) polymer in a reaction mass containing less than 20% by weight of contaminants, after the reaction mass is discharged from a polymerization reactor, the process comprising the steps of,
   (1) feeding the reaction mass including the polymer having (Mw/Mc)>1, wherein Mc is the critical molecular weight of entanglement, and unwanted contaminants to a disentangling means;
   (2) extensively shear-thinning the reaction mass to produce modified polymer in a shear-thinned reaction mass until the polymer in the reaction mass has a viscosity at least 5% lower than that of the polymer fed to the inlet;
   (3) feeding the sheer-thinned reaction mass including modified polymer to a polymer recovering means;
   (4) removing the unwanted contaminants; and,
   (5) recovering decontaminated, modified, undegraded, substantially pure polymer having a melt flow index at least 10% lower than that of unmodified polymer, and, having substantially the same molecular weight Mw as that of the polymer before it is modified.

2. A process for purifying a high molecular weight (Mw) polymer in a reaction mass containing in excess of about 20% by weight of contaminants, after the reaction mass is discharged from a polymerization reactor, comprising the steps of:
   (1) feeding the reaction mass including the polymer having (Mw/Mc)>1, wherein Mc is the critical molecular weight of entanglement, and unwanted contaminants including solvent(s), unreacted monomer(s) and byproduct(s), to a pretreatment means to yield pretreated polymer in a pretreated stream;
   (2) feeding the pretreated stream to a disentangling means;
   (3) extensively shear-thinning the pretreated stream to produce modified polymer in a shear-thinned reaction mass until the polymer in the pretreated stream has a viscosity at least 5% lower than that of the polymer fed to the inlet;
   (4) feeding the sheer-thinned pretreated stream including modified polymer to a polymer recovering means;
   (5) removing remaining unwanted contaminants; and,
   (6) recovering decontaminated, undegraded, modified substantially pure polymer having a melt flow index at least 10% lower than that of unmodified polymer, and, substantially the same molecular weight as that of the unmodified polymer.

3. A process for purifying a high molecular weight (Mw) polymer in a reaction mass containing in excess of about 20% by weight of contaminants, after the reaction mass is discharged from a polymerization reactor, comprising the steps of:
   (1) feeding the reaction mass including polymer having (Mw/Mc)>1, wherein Mc is the critical molecular weight of entanglement, and having at least one reactive chain end, unreacted monomer(s) and unwanted contaminants including solvent(s), and byproduct(s), to a disentangling means;
   (2) extensively shear-thinning the reaction mass to produce modified polymer having a viscosity at least 10% lower than that of the polymer fed to the inlet, and, concurrently removing unwanted volatile contaminants from within the disentangling means through vents therein;
   (3) feeding shear-thinned reaction mass to a polymer-recovering means; and,
   (4) recovering devolatilized substantially pure modified polymer having a melt flow index at least 10% lower than that of unmodified polymer, and, substantially the same molecular weight as that of the polymer before it is modified.

4. A process for purifying a polymer comprising the steps of:
   (1) providing a reaction mass from a polymerization reactor, said reaction mass comprising a polymer and contaminants;
   (2) feeding the reaction mass to a processor;

(3) extensively shear-thinning the reaction mass to produce a modified polymer by reducing the viscosity of the polymer; and (4) recovering modified polymer.

5. The process of claim 4, wherein in the recovering step the recovered modified polymer has a melt flow index at least 5% lower than the melt flow index of the polymer before it is modified.

6. The process of claim 4, wherein in the recovering step the recovered modified polymer has a melt flow index at least 10% lower than the melt flow index of the polymer before it is modified.

7. The process of claim 4, wherein the polymer in said reaction mass has a Mw/Mc≧1.

8. The process of claim 4, wherein the polymer in said reaction mass has a molecular weight in excess of 5,000.

9. The process of claim 4, wherein the polymer in said reaction mass has a molecular weight in excess of 5,000 and is selected from the group consisting of a condensation polymer, a solution polymerized polymer, a bulk polymerized polymer and a melt polymerized polymer.

10. The process of claim 4, wherein, after the extensively shear-thinning step and before the recovering step, the process comprises the additional steps of:

removing at least a portion of the contaminants from the reaction mass;

recycling at least a portion of the reaction mass to a processor; and extensively shear-thinning the reaction mass to reduce the viscosity of the polymer;

wherein in the recovering step the recovered modified polymer has a melt flow index at least 10% lower than the melt flow index of the polymer before it is modified.

11. The process of claim 4, wherein, after the extensively shear-thinning step and before the recovering step, the process comprises the additional steps of:

removing at least a portion of the contaminants from the reaction mass;

recycling at least a portion of the modified polymer into a polymerization reactor, said polymerization reactor including at least one monomer; and reacting the modified polymer with the at least one monomer to increase the molecular weight of the modified polymer.

12. The process of claim 11, wherein in the recovering step the recovered modified polymer has a molecular weight at least 5% higher than the molecular weight of the polymer provided in step (1).

13. The process of claim 11, wherein in the recovering step the recovered modified polymer has a molecular weight at least 10% higher than the molecular weight of the polymer provided in step (1).

14. The process of claim 4, wherein before the feeding step the process comprises the additional step of pretreating the reaction mass in a pretreatment means to reduce the amount of contaminants.

15. The process of claim 4 where the processor has vents and at least some contaminants are volatile contaminants, and where the process includes the step of, during the extensively shear-thinning step, venting at least some volatile contaminants.

16. The process of claim 15, wherein in the recovering step the recovered modified polymer has a molecular weight at least 5% higher than the molecular weight of the polymer provided in step (1).

17. The process of claim 15, wherein in the recovering step the recovered modified polymer has a molecular weight at least 10% higher than the molecular weight of the polymer provided in step (1).

18. The process of claim 15, wherein in the recovering step the recovered modified polymer has a melt flow index at least 10% lower than the melt flow index of the polymer before it is modified.

19. A modified polymer produced according to claim 4, wherein the recovered modified polymer has less than about 1,000 ppm of contaminants.

20. A modified polymer produced according to claim 4, wherein the recovered modified polymer has less than about 500 ppm of contaminants.

21. A modified polymer produced according to claim 4, wherein the recovered modified polymer has less than about 100 ppm of contaminants.

* * * * *